(12) United States Patent
Bernardi et al.

(10) Patent No.: US 6,683,952 B1
(45) Date of Patent: Jan. 27, 2004

(54) HEADSET ADAPTER WITH DETACHABLE UNDER-THE-PHONE ACCESSORY DECK

(75) Inventors: Robert J. Bernardi, Scotts Valley, CA (US); Gerald W Skulley, Santa Cruz, CA (US); Thomas A. Tedham, Eden Prairie, MN (US); Jeffrey B Waffensmith, Robbinsdale, MN (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 09/384,037

(22) Filed: Aug. 26, 1999

(51) Int. Cl.$^7$ ................................. H04M 1/00
(52) U.S. Cl. ................ 379/447; 379/430; 379/438; 379/420.04; 379/446
(58) Field of Search ................ 379/447, 454, 379/446, 485, 430, 438, 442, 420.04; 174/135; 439/211

(56) References Cited

U.S. PATENT DOCUMENTS

| | | | | |
|---|---|---|---|---|
| 3,345,470 A | * | 10/1967 | Hoffmann | 379/454 |
| 4,092,502 A | * | 5/1978 | Jones | 379/442 |
| 4,718,085 A | * | 1/1988 | Haskins | 379/447 |
| 5,187,744 A | * | 2/1993 | Richter | 379/446 |
| 5,595,494 A | * | 1/1997 | Wiebe | 439/211 |
| 5,850,440 A | * | 12/1998 | Hannon et al. | 379/454 |
| D405,093 S | | 2/1999 | Sawhney et al. | D140/240 |
| 6,081,596 A | * | 6/2000 | Britto et al. | 379/447 |
| 6,141,418 A | * | 10/2000 | Weiser et al. | 379/454 |
| 6,184,474 B1 | * | 2/2001 | Craft, Jr. | 174/135 |

OTHER PUBLICATIONS

"Plantronics A20 Headset System Wins Teleconnect's Editor's Choice 2000 Award", http://biz.yahoo.com/bw/000208/ca_plantro_1.html, Feb. 8, 2000.

www.hellodirect.com webpage regarding a RediLine™ remote access lifting device (date unknown)

Smith Corona 1998 Preliminary Spec Sheet for the TelEsprit™ 1600.

www.hellodirect.com catalog page regarding various RediLine cordless headsets (date unknown).

www.hellodirect.com webpage regarding RediLine™'s remote access lifting device (date unknown).

* cited by examiner

Primary Examiner—Jack Chiang
(74) Attorney, Agent, or Firm—Peter Hsieh

(57) ABSTRACT

A telephone headset adapter includes a deck with a top surface for supporting a telephone. The deck is placed underneath a telephone, and the weight of the telephone is applied on the deck and stabilizes the deck. The deck includes a primary or fixed deck portion and a movable deck portion. The movable deck portion is coupled to the fixed deck portion by an extension slide. The movable deck portion is movable along the extension slide to vary the width of the deck. Thus, the deck can support and accommodate telephone sets of various sizes and configurations. Routing channels are also formed within the top surface of the deck for receiving cords that are used with the telephone set, handset, headset and accessories, thereby minimizing cord tangling and clutter. An electronic housing is removably coupled to an end of the deck. The electronic housing contains adapter components for coupling the telephone to the headset or handset. Alternatively, the adapter components are housed within an interior portion of the deck.

15 Claims, 11 Drawing Sheets

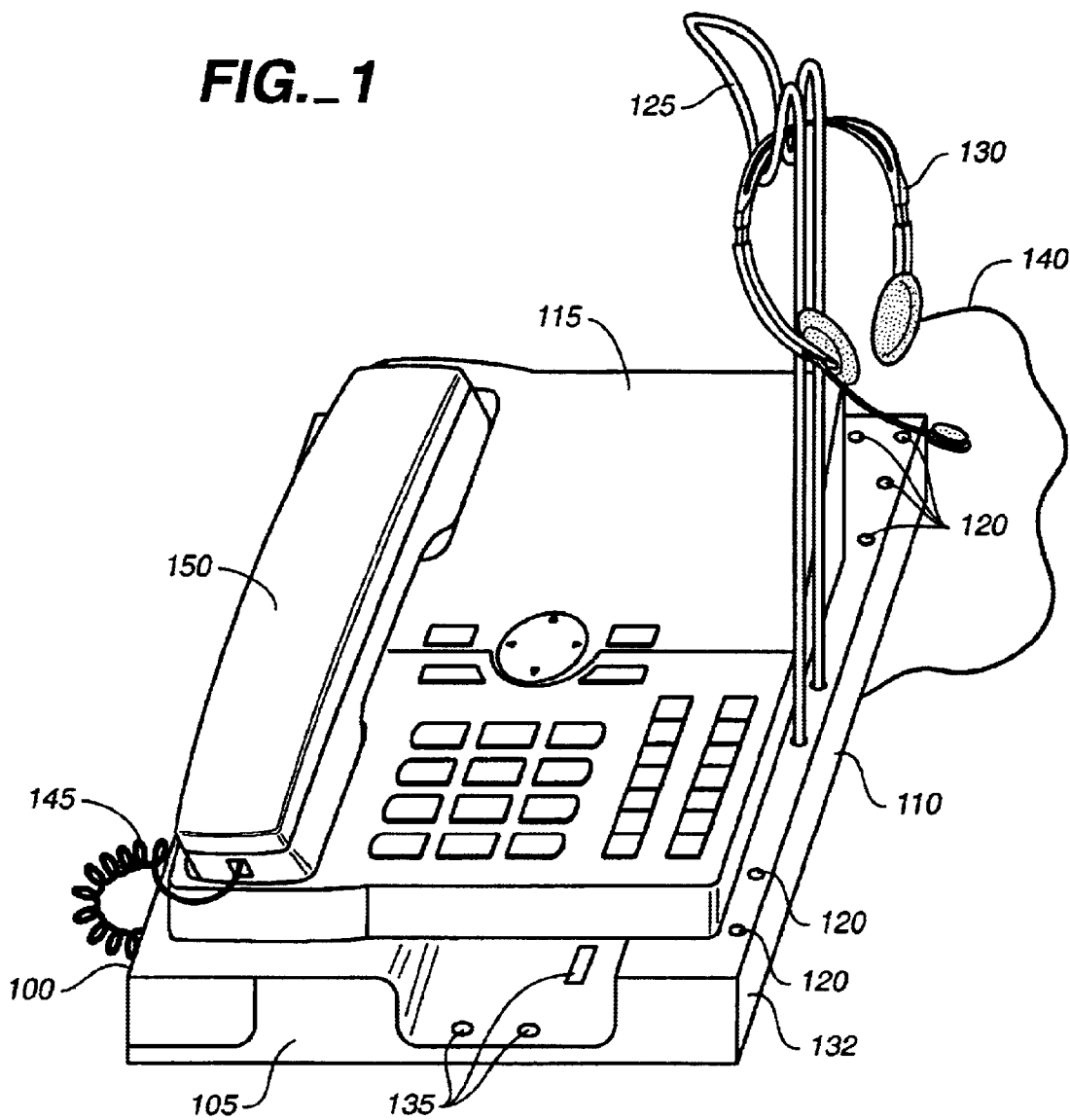
FIG._1

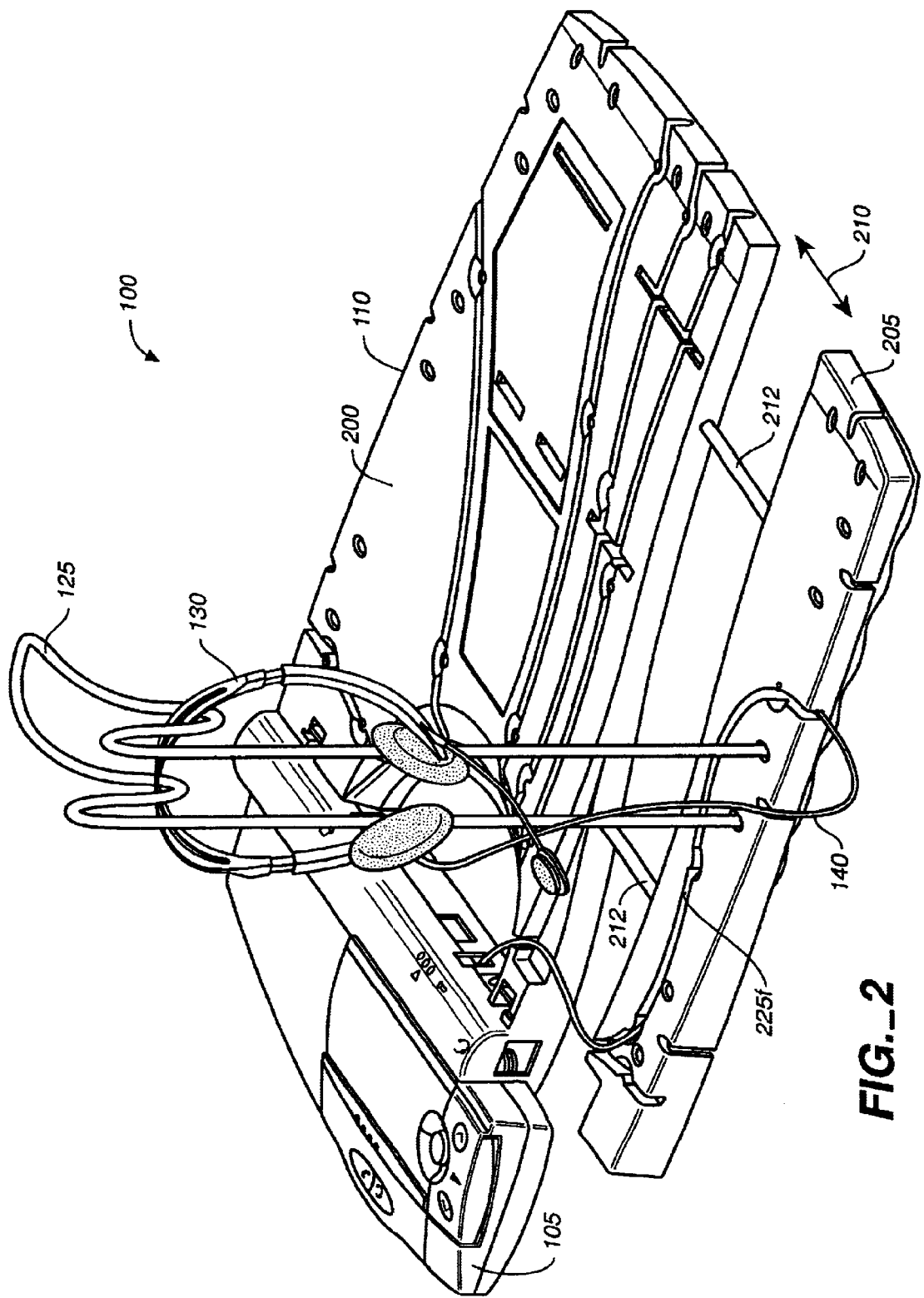
FIG._2

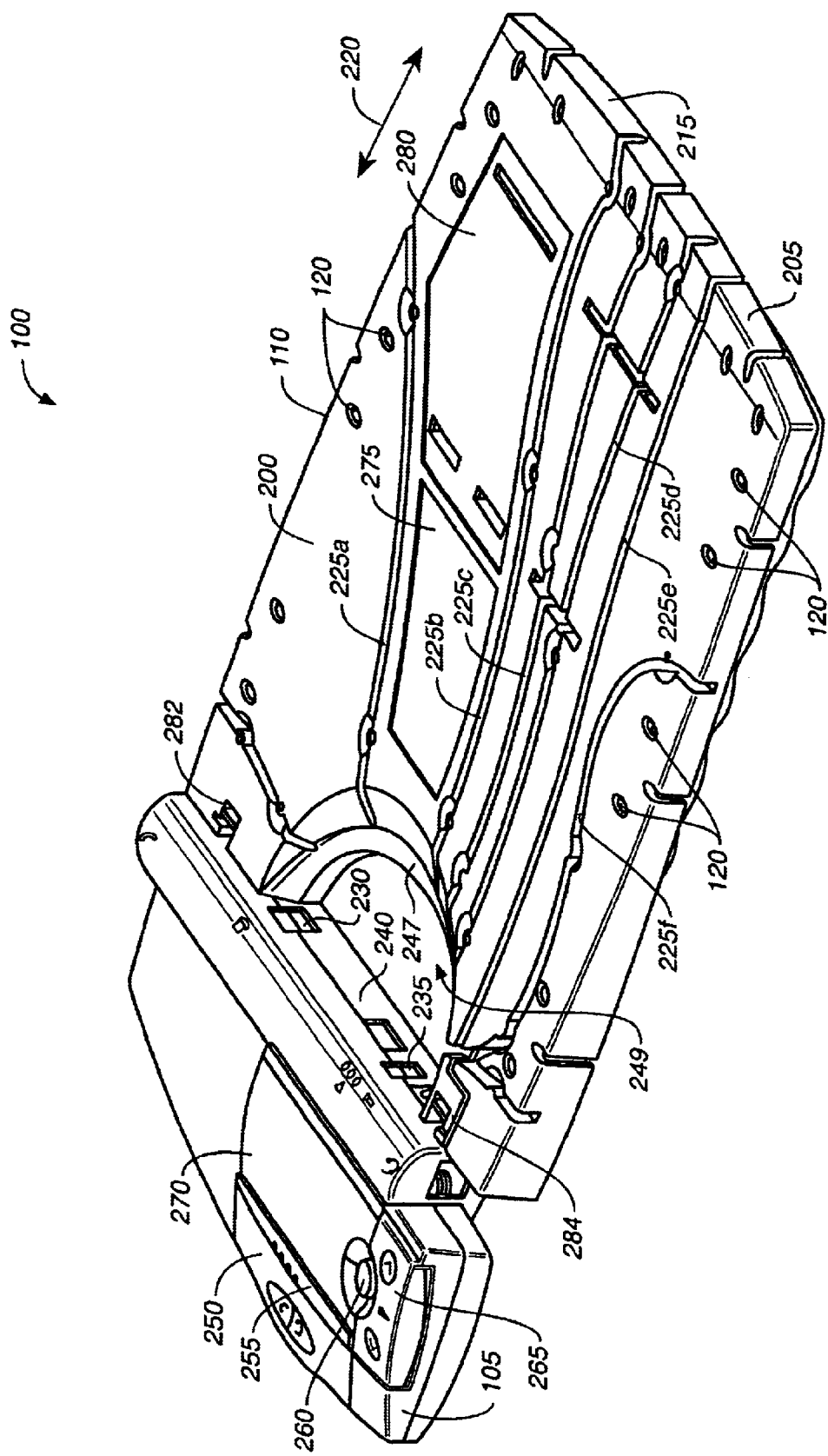
FIG._3

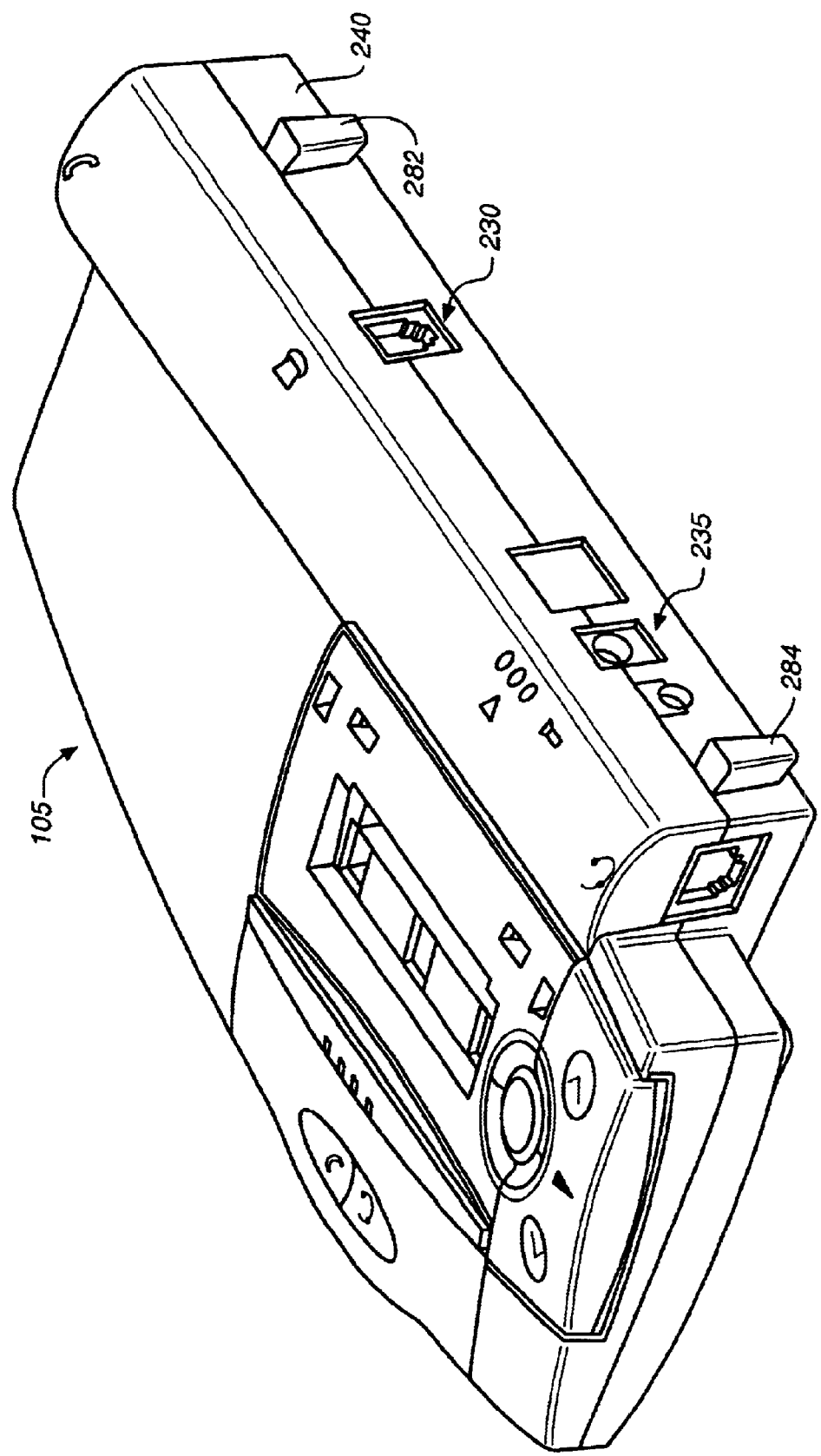
FIG._4

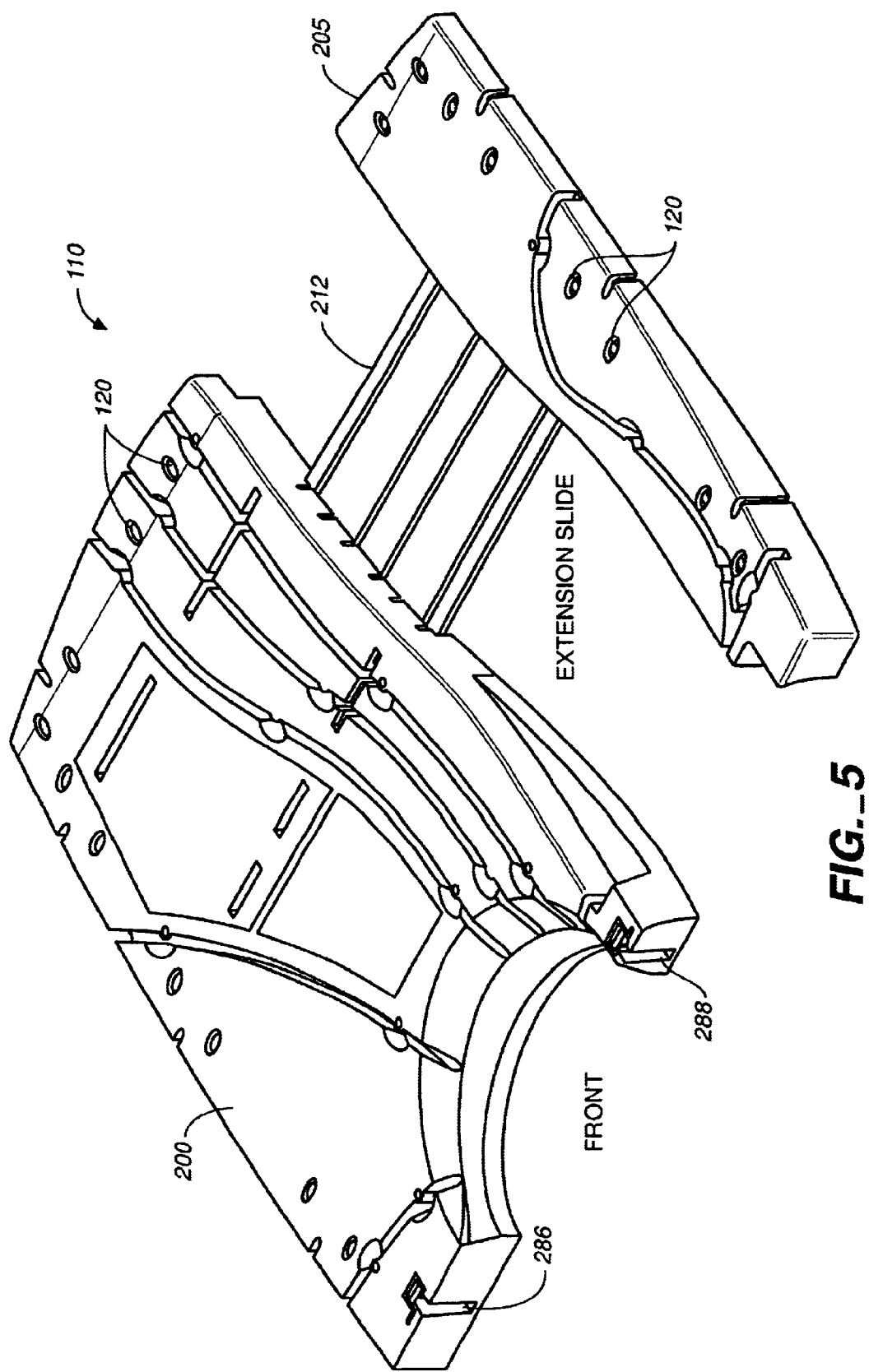
FIG._5

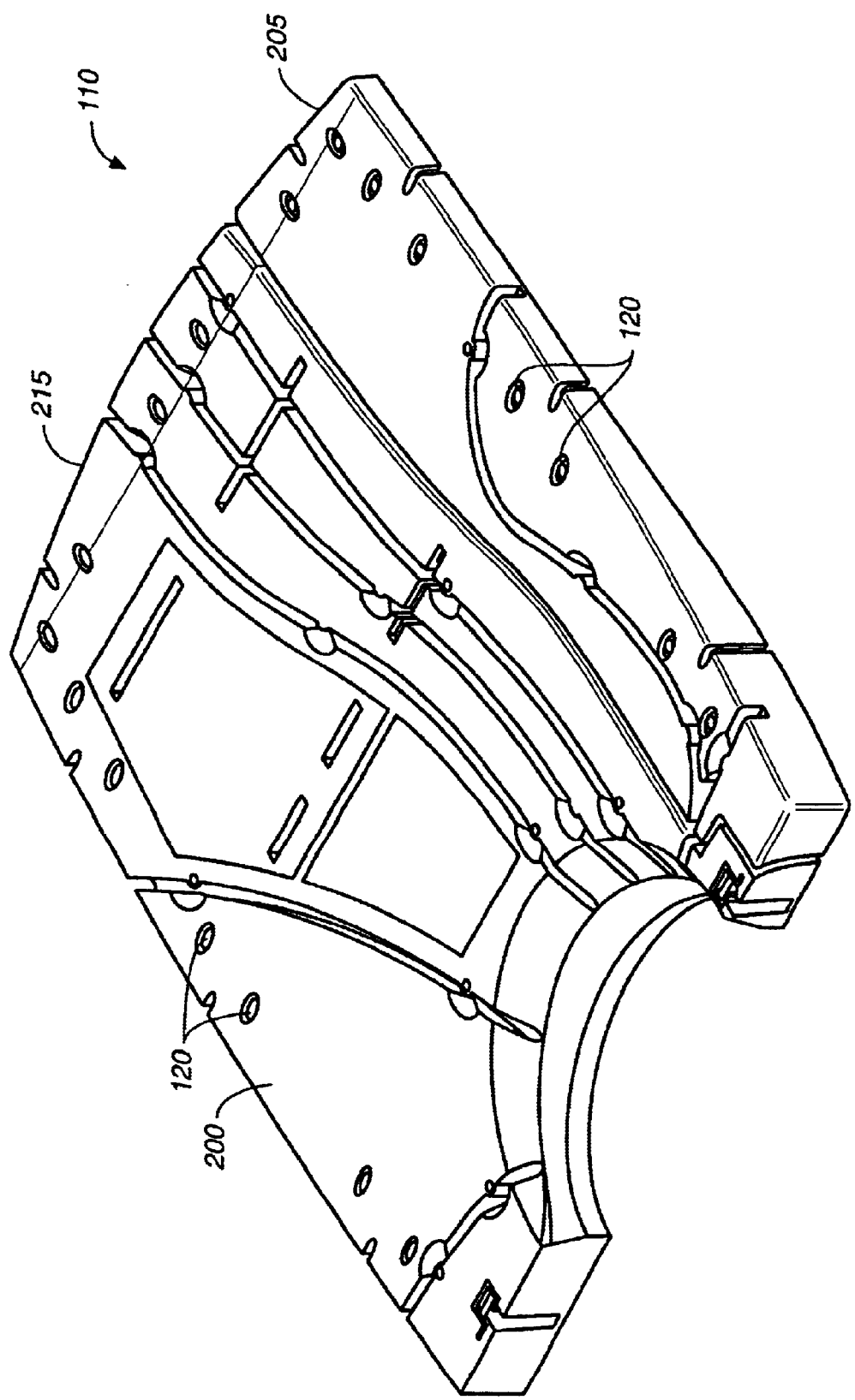
FIG._6

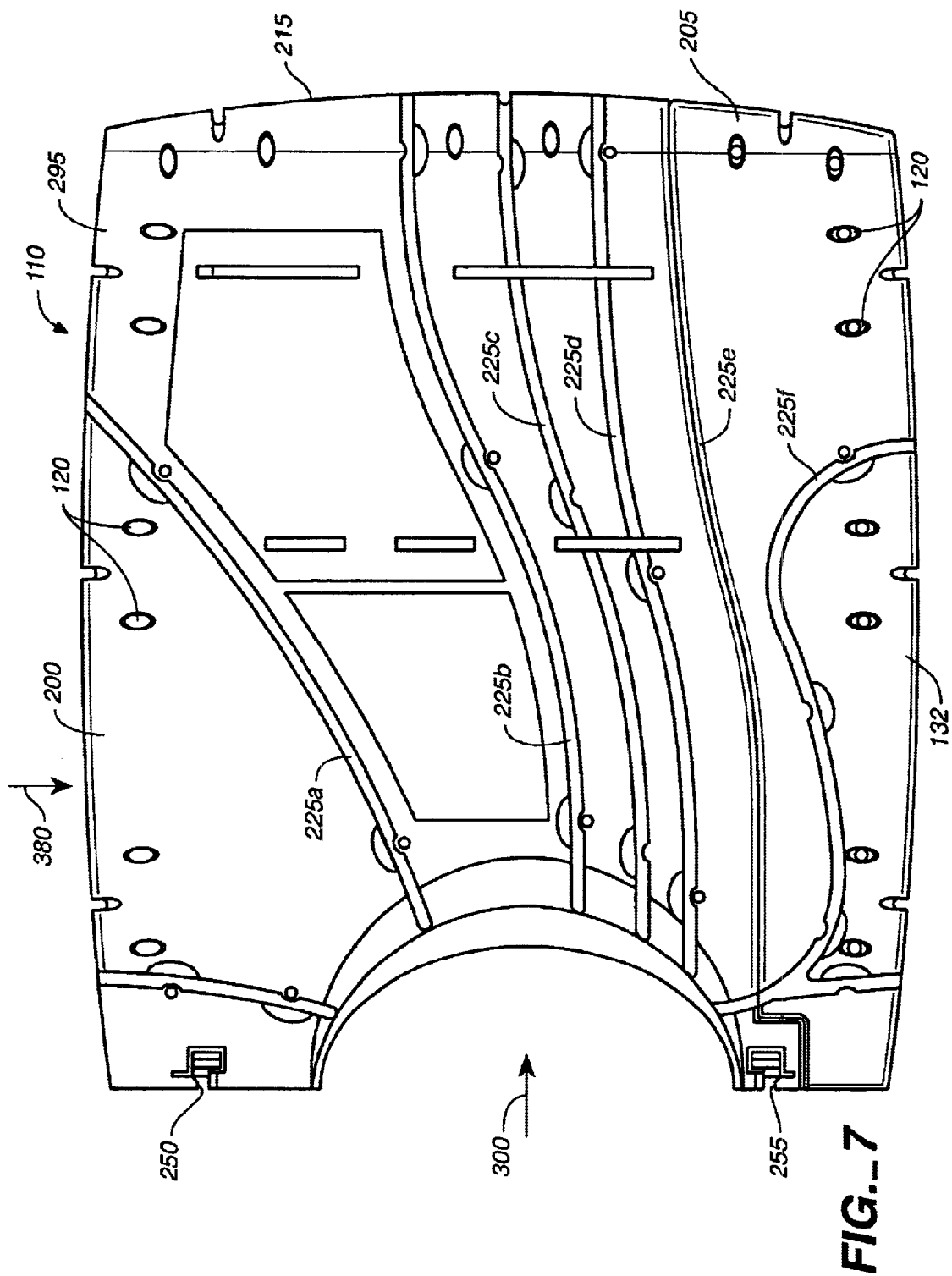
FIG._7

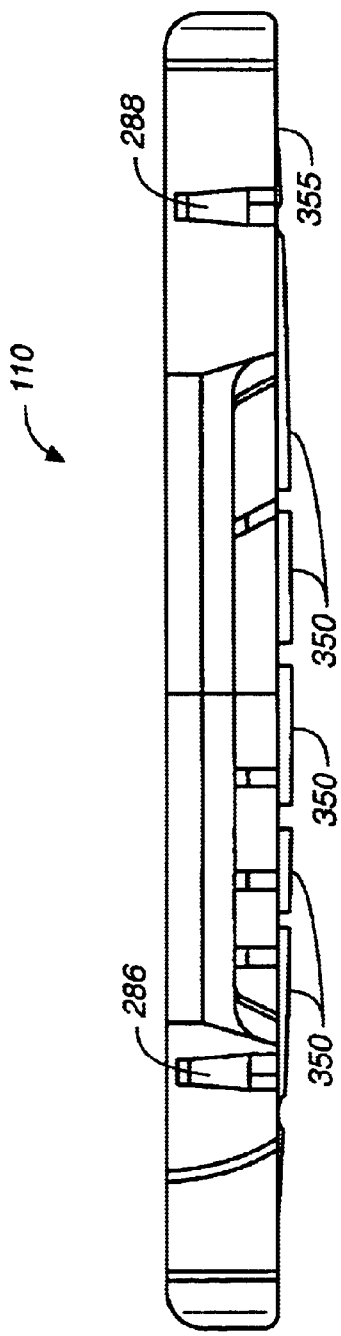
FIG._8
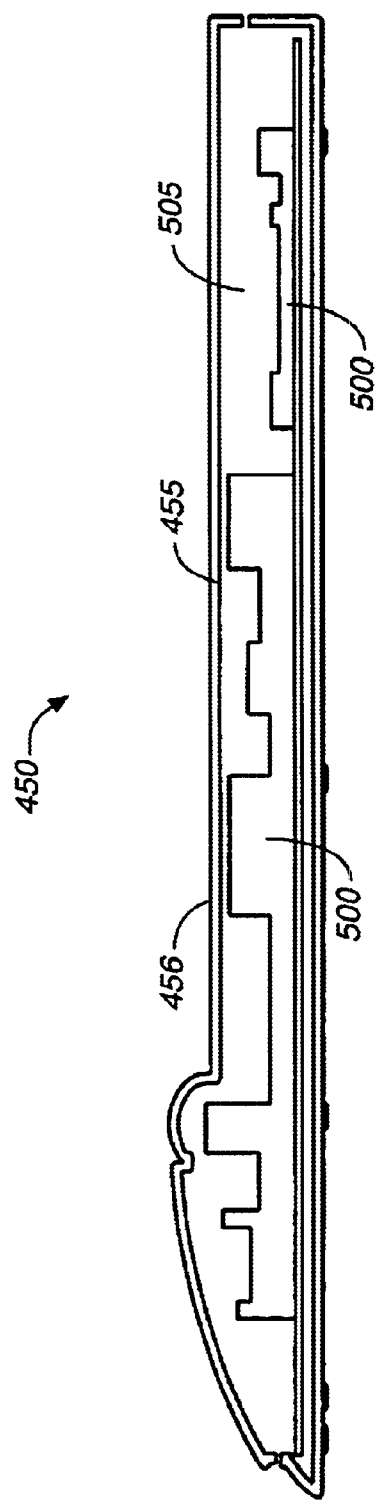
FIG._9B

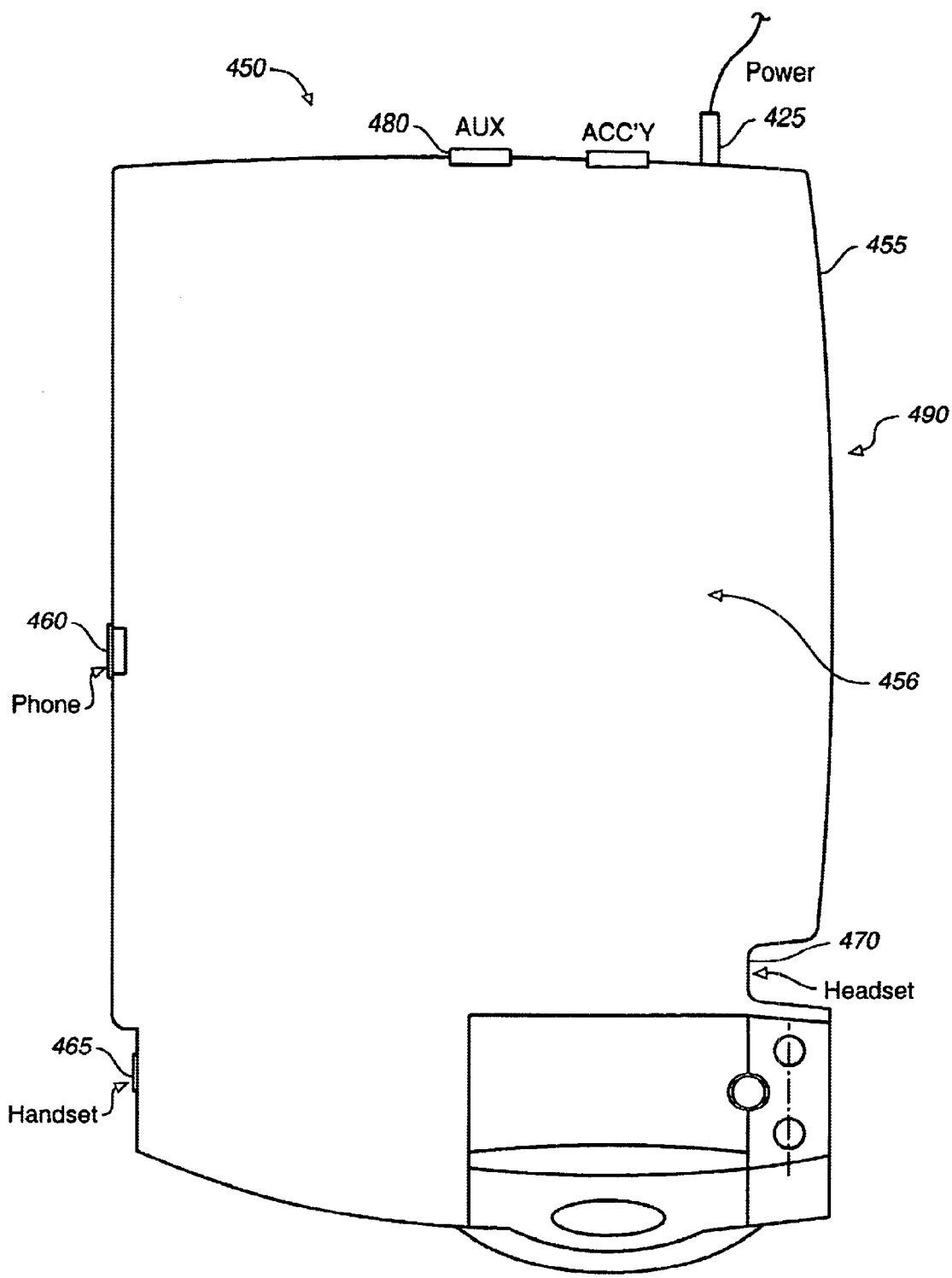
FIG._9A

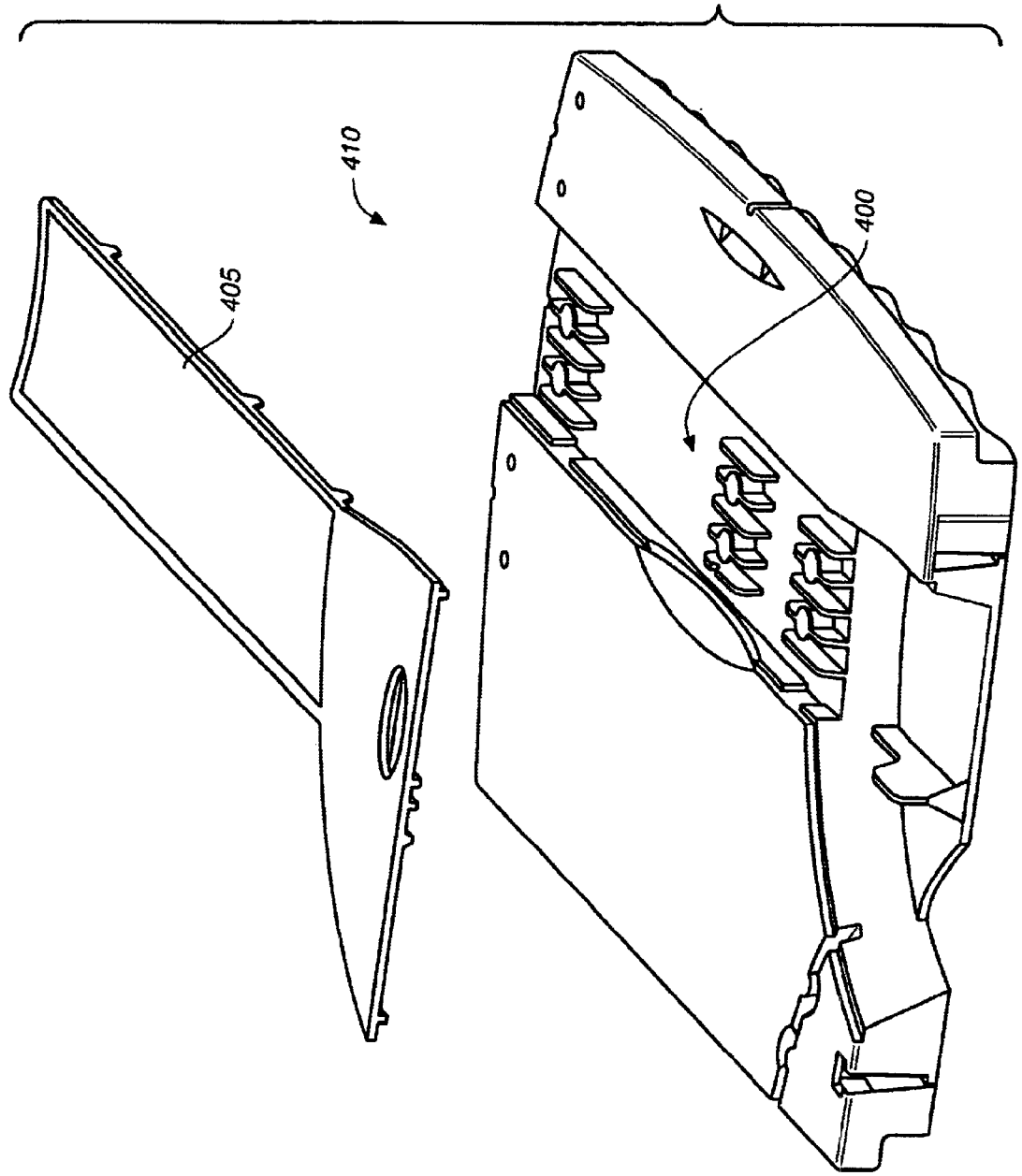
FIG._10

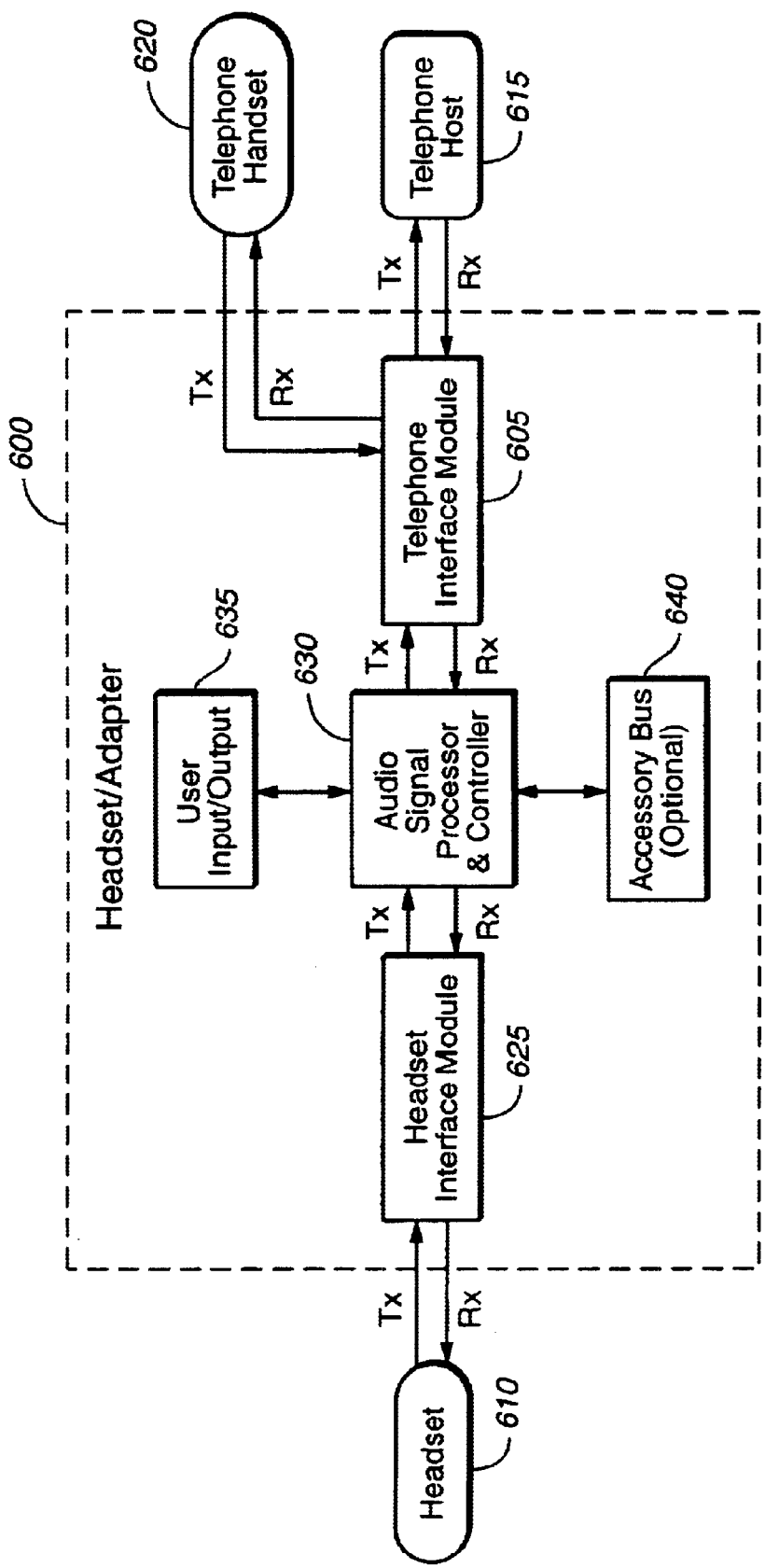
FIG._11

HEADSET ADAPTER WITH DETACHABLE UNDER-THE-PHONE ACCESSORY DECK

FIELD OF THE INVENTION

The present invention relates generally to the field of terminal devices, and more particularly to the field of telephone headset adapters that may be connected physically and electrically to a variety of telephones.

BACKGROUND OF THE INVENTION

Telephone headset adapters allow the connection of a headset to a variety of telephones by adjusting for connector wiring and signal level differences at the handset modular port of the telephone. Headset adapters also allow for the selection between a headset or a handset as the talk/listen device that functions with the telephone set.

Conventional telephone headset adapters are free standing, as seen, for example, in the models M10 and M12 from Plantronics, Inc., Santa Cruz, Calif. These adapters typically are placed next to the user's telephone, and connect to the telephone with short connecting cables. Both the telephone handset and the headset are likewise connected to the headset adapter. Since conventional headset adapters are free standing, it is a common occurrence for a user to inadvertently drag the headset adapter off or about a desk (or table) on which the headset adapter is disposed, when the headset cord is stretched. Moreover, since the handset is plugged into the adapter to allow switching between the handset and headset, the use of the handset may also cause the adapter to be dragged across or off the desk, particularly if the coiled cord of the handset is extended. Thus, the user suffers from inconvenience if the headset adapter is dragged off or about the desk.

One previous approach to minimize the adapter dragging problem is to secure the adapter to the desk top or telephone, for example, by use of a double-sided foam adhesive tape. The various disadvantages of this approach include: (1) possible damage or defacement to the telephone or desk top; and/or (2) the resulting difficulty in moving the telephone to a different location on the desk top.

Conventional headset adapters also require valuable desk top space, in addition to the space required for the telephone. Precious desk top space may also be wasted to accommodate accessories to the conventional headset adapter or telephone. Examples of such accessories include a handset lifter for answering the telephone, a headset holder for supporting the telephone headset, an online indicator that indicates when the telephone is in use, and the like. Furthermore, the cords that are used with the conventional headset adapter, telephone, and/or the accessories may also disadvantageously take up additional desk top space. Thus, conventional headset adapters do not provide a solution that minimizes the desk top area that is typically required for the adapter, phone, accessories, and/or associated cords.

A further problem of conventional headset adapters is due to the cluttering and tangling of cords that are associated with the conventional headset adapter, accessories and/or phone. Since a headset adapter must "piggyback" or enable electrical connections between the headset and the telephone handset port, a number of extra cords are necessary to permit these electrical connections. The extra cords lead to undesired clutter or tangling on the desk top that supports the telephone set.

As an additional problem, accessories to conventional headset adapters require inconvenient mounting to the telephone and additional connection cords that further clutter the desk top.

Previous solutions to the accessory mounting problem have included the use of free-standing accessories that are attached by, for example, Velcro® or tape to the telephone or desk top. However, the above solutions have various disadvantages such as the difficulty in the installation of the accessory, the defacement of the telephone or desk top caused by the required attachment mechanism, and the resulting desk top clutter and reduced desk top space when multiple accessories occupy the desk top space.

Accordingly, it is desirable to provide an improved headset adapter that overcomes the foregoing deficiencies of conventional headset adapters.

SUMMARY OF THE INVENTION

The present invention provides a telephone headset adapter that may be connected physically and electrically to a variety of telephones that may differ in size and configuration. In one aspect of the invention, the headset adapter includes a deck with a top surface for supporting a telephone. The weight of the telephone, therefore, is applied on the deck and stabilizes the deck. Thus, when a user stretches a headset or handset coupled to the headset adapter, the weight of the telephone prevents dragging of the headset adapter. Additionally, since the deck is placed underneath the telephone, the present invention is able to save valuable desk top space.

In another aspect of the present invention, the size of the deck, preferably the width, is adjustable. One embodiment of this aspect includes the deck having a primary fixed deck portion and a movable deck portion. The movable deck portion is coupled to the fixed deck portion by, for example, an extension slide. The movable deck portion is movable along the extension slide to vary the width (or length) of the deck, thereby permitting the deck to support and accommodate telephone sets of various sizes and configurations.

In another aspect of the present invention, routing channels are formed within the deck top surface for receiving and securely holding cords that are used to couple the adapter to the telephone set, handset, headset, and/or accessories. Thus, the present invention minimizes cord tangling and clutter, and is further able to minimize the desk top space that would otherwise support the cords.

In another aspect of the present invention, an electronic housing is removably coupled to an end of the deck. The electronic housing contains adapter components for coupling the telephone to the headset or handset and for controlling the adapter's functional operation such as volume control, mute function, tune control, transmit volume control, headset/handset selection, and the like. By making the adapter housing to be removable from the deck, the adapter may be separately replaced or upgraded from the deck. This reduces long term manufacturing cost. In addition, the removable feature of the adapter housing permits various different product configuration options. For example, different adapter models and upgrades may be interchanged with the same deck.

Alternatively, some of the adapter components are housed within an interior portion of the deck. This embodiment has the advantage of providing additional space for components, allowing for a reduction in the size of the portion of the adapter not located under the phone or an increase in the functionality provided by the adapter.

The present invention also enhances the headset experience of the user, by eliminating the annoyances associated with dangling or unstable adapters, messy cords, and desk clutter.

BRIEF DESCRIPTION OF THE DRAWINGS

FIG. 1 is a front perspective view of a headset adapter in accordance with an embodiment of the present invention wherein the headset adapter supports a telephone;

FIG. 2 is a perspective view of the headset adapter of FIG. 1;

FIG. 3 is a perspective view of the headset adapter of FIG. 1 wherein the details of the deck of the headset adapter are shown;

FIG. 4 is a perspective view of the adapter connector panel in the headset adapter of FIG. 1;

FIG. 5 is a perspective view of the deck of the headset adapter of FIG. 1 wherein the movable deck portion is extended from the fixed, deck portion;

FIG. 6 is a perspective view of the deck of the headset adapter of FIG. 1 wherein the movable deck portion is not extended from the fixed deck portion;

FIG. 7 is a top plan view of the deck of the headset adapter of FIG. 1;

FIG. 8 is a front perspective view of the deck of FIG. 7;

FIG. 9A is a top view of a headset adapter in accordance with another embodiment of the present invention;

FIG. 9B is a side view of a cross-section of the headset adapter of FIG. 9A;

FIG. 10 is a perspective view of another embodiment of a deck having single, wide channels for improved cord management; and FIG. 11 is a schematic block diagram of a headset adapter circuit that could be implemented in the present invention.

DETAILED DESCRIPTION OF THE PREFERRED EMBODIMENTS

FIG. 1 is a front perspective view of a headset adapter 100 in accordance with an embodiment of the present invention. The headset adapter system 100 includes a front electronic housing 105 which contains electronic components (not shown) for conventional headset adapter functions (e.g., volume, mute, tone, transmit level, headset/handset selectors and the like) and a printed circuit board(s) for supporting these electronic functions. In one embodiment, the electronic housing 105 may be removably coupled to a deck 110. The deck 110 includes a plurality of holes 120 that may securely receive headset accessories that beneficially extend the usefulness of a headset or telephone. One such accessory is a headset holder 125 for supporting a headset 130 that functions with the headset adapter 100. Another example of an accessory is a conventional cord retraction device (not shown) that takes the place of a coiled headset cord, in order to further reduce cord clutter. The holes 120 or other accessory mounting components (e.g., a headset holder stand, an on-line indicator stand, and the like) may be placed in a variety of locations on the deck 110. Additionally, a handset lifter (not shown) can be attached to the accessory deck. The lifter is a device for lifting the handset off its hook switch to provide remote telephone answering capability. Thus, various accessories may be mounted adjacent to the sides or rear of the telephone set 115 and adjacent to the perimeter of the deck as defined by the sides of the deck (e.g., side 132). The holes 120 or accessory mounting components enable the deck 110 to hold various accessories in a stable manner without requiring additional desk space. Thus, the headset adapter 100 overcomes a problem of conventional devices of requiring desk space to support accessory components. Additionally, since the accessories are mounted near the telephone set 115, the user can conveniently access the accessory when using the telephone set 115.

When the telephone set 115 is placed on the deck 110, the electronic housing 105 is disposed in front of the telephone set 115, thereby permitting the user to easily access the control buttons 135 for controlling the function and operation of the headset adapter 100. By placing the deck 110 under the telephone set 115, the headset adapter 100 saves desk top space and minimizes the number of cords that clutter the desk top. In addition, the weight of the telephone set 115 on the deck 110 holds the headset adapter 100 in a stable or fixed position, particularly if the cord 140 of the headset 130 is extended and/or if the cord 145 of the handset 150 is extended. Thus, by placing the deck 110 under the telephone set 115, the headset adapter 100 is not pulled or dragged off or about a supporting surface, as the user moves about while utilizing the headset 130 or handset 150.

Reference is now made to FIGS. 2 and 3 which show the headset adapter 100 in additional detail. In one embodiment, the deck 110 includes a primary fixed deck portion 200 and a movable deck portion 205 that slides in the direction of double-headed arrow 210 (FIG. 2) to vary the width of the deck 110. Extension slides 212 couple together the fixed deck portion 200 and the movable deck portion 205. FIG. 5 shows an alternate embodiment of the slides 212 as a flat guide plate. Thus, the deck 110 may be enlarged to accommodate larger-sized telephone sets by extending the movable deck portion 205, away from the fixed deck portion 200, as shown in FIG. 2. The movable deck portion 205 may also not be extended from the fixed deck portion 200, as shown in FIG. 3, to accommodating smaller-sized telephone sets.

In another embodiment not shown, a movable deck portion may be coupled to an end 215 (FIG. 3) of the deck 110 so that the length of deck 110 may be varied in the direction of arrow 220 to accommodate telephone sets with other configurations.

As shown in FIG. 3, in one embodiment the deck 110 may include cable management channels (or cord routing channels) 225a–225g for receiving and securing the cords associated with the headset 130, accessories, telephone set 115, and/or headset adapter 100. These channels advantageously reduce the cord tangles and cord clutter that occur with conventional headset adapters and/or accessories. Each one of the routing channels 225a–225g exits from either a side or the rear 215 of the deck 110. Thus, a headset cord may conveniently route from a side or from the rear of the deck. The multiple number of routing channels also advantageously permits the headset adapter 100, for example, to support multiple accessories and to support telephone sets with multiple cords. The cords in the channels 225a–225g may then be coupled to one of the jacks 230 or 235 on the adapter connector panel 240 of the electronic housing 105. For example, the headset cord 140 (FIG. 2) is routed through channels 225f and connected to headset jack 235. The handset cord 145 (FIG. 1) may be routed through, for example, channel 225b and connected to handset jack 230. As another example, the telephone set power cord and/or accessory cords maybe routed in the channels of the deck 110.

The deck 110 may include a curved portion 247, which permits easy access by hand to the jacks 230 and 235. To connect cord to or disconnect cords from the jack 230 and/or jack 235, the user can conveniently insert his or her fingers through an opening 249 which is formed as a result of the curved portion 247. The curved opening also provides clearance for the plugs that connect to the sockets of connector panel 240.

As further shown in FIG. 3, the control buttons on the electronic housing 105 may include, for example, the following: a headset/handset selector switch 250 for coupling the adapter 100 to the headset 130 (FIG. 1) or to the handset 150 (FIG. 1), a mute switch 255 for enabling a mute function for the headset 130, a mode switch 260 to select adjustment of volume, tone, and balance, and an up/down rocker switch 265 for control of the adjustment range for the selected mode (e.g., increase/decrease volume). Other control buttons may be provided on the electronic housing 105 for controlling other various conventional adapter functions. In addition, the electronic housing 105 may include an LED display 270 for displaying various status indicators for the headset adapter 100.

As also shown in FIG. 3, the deck 100 may include label wells 275 and 280 for installation or other instructions, model designation or certification numbers.

The electronic housing 105 may be removably coupled to the deck 110 by use of coupling elements such as attachment snaps (or clips) 282 and 284 that are inserted into slots 286 and 288 (FIG. 5), respectively, on the deck 110. In one embodiment, FIG. 4 shows the clips 282 and 284 as dovetail clips that are placed on the rear panel 240 of the electronic housing 105 of the adapter. Alternatively, the attachment snaps or clips 282 and 284 may be mounted on the deck 110 and the slots 286 and 288 may be formed on the adapter connector panel 240.

FIG. 5 shows the deck 110 removed from the electronic housing 105 and having the movable deck portion 205 extended away from the fixed deck portion 200 to accommodate longer-width telephones. FIG. 6 shows the movable deck portion 205 disconnected from the electronic housing 105 and disposed in the non-extended position to accommodate telephones with relatively shorter widths.

FIG. 7 is a top plan view of the deck 110 which is shown to further illustrate the components of the deck, such as the routing channels 225a–225g. As in FIG. 6, the movable deck portion is shown in the non-extended position. As also clearly shown in FIG. 7, the holes 120 may be formed near the deck perimeter (which is defined by sides 132 and 295 and rear 215). As a result, accessories may be placed near the perimeter of the deck 110 and securely placed in the holes 120. As also stated above, other mounting elements may be coupled near the perimeter of the deck 110 for securely supporting the accessories. The use of holes or mounting elements to secure the accessories advantageously eliminates the problem of defacement to the telephone or desk top surface. Furthermore, since the deck 110 can support the accessories, the present invention further permits desk top space to be saved and not be used for supporting the accessories.

FIG. 8 is a front perspective view of the deck 110, as seen from the viewpoint represented by arrow 300 in FIG. 7. A plurality of high friction rubber feet elements 350 or other stabilizing elements may be attached to the bottom surface 355 of the deck 110. The rubber feet elements 350 serve to improve the stability of the deck 110 if the deck is mounted on a surface and helps to prevent the deck from sliding when pulled. The number of rubber feet elements attached to the bottom surface 355 may vary.

It should be understood that, in the embodiment illustrated in FIGS. 2 to 8, a deck cover or surface (not shown) may be placed on top of the deck 110 to cover the channels 225a–225g and other components of the deck 110. For example, FIG. 10 shows individual segmented wire channels 400 that may be covered by a removable cover plate 405. The telephone set 115 (FIG. 1) may then be placed on the deck cover plate 405, thereby providing weight to prevent dragging of the deck 410.

It is further noted that FIG. 10 shows another version of a deck that may be coupled to the front electronic housing 105 (FIG. 1) to form an adapter in accordance with the present invention. The deck 410 includes the wide channel features of channels 400 to permit improved cord routing and management.

FIG. 9A is a plan and elevation view of a headset adapter 450 in accordance with another embodiment of the present invention. In this embodiment the adapter components are contained in a unitary housing 455 allowing the area under the phone support deck 456 to be utilized in addition to the portion of the adapter housing visible in front of the host telephone. Routing channels are not utilized on the embodiment since connections are available at the side and back of the telephone via the componentry located in the deck. For example, the phone jack 460, handset jack 465, and headset jack 470 are located at the sides of the housing 455. Power connection 475, auxiliary jack 480 and other jacks may be located at the rear of the housing 455.

FIG. 9B is a side view of adapter 450 as seen from the direction of arrow 490 in FIG. 9A. Electronic components 500 are disposed within the interior 505 of the housing 455 of the adapter 450. The electronic components 500 provide the conventional adapter functionality and may implement, for example, the headset adapter circuit 600 shown in FIG. 11.

The material that may be used to form the adapter of the present invention is preferably ABS plastic. The characteristics of the preferred material that are significant to achieve the desired performance include materials that are easy to injection mold, strong, and cost effective. The suppliers of the preferred materials include, for example, General Electric (G.E.) and other suppliers. The deck and adapter housing may be formed by, for example, plastic molding injection.

FIG. 11 is a schematic block diagram showing a headset adapter circuit 600 that could be implemented in the present invention. For example, the adapter circuit 600 may be implemented within the electronic housing 105 of FIG. 4 or within the interior 505 of the headset adapter 450 of FIG. 9B. The headset adapter circuit 600 includes telephone interface module 605 which serves as the connection between headset system 610 and the telephone network via host phone 615. There are several possible host phone systems that are capable of interfacing with the headset adapter circuit 600. They can be categorized into tip/ring telephones, PBX systems and ACD systems. The telephone interface module 605 typically performs four functions: handset port wiring configuration, impedance and gain matching, isolation, and switching between the headset 610 and telephone handset 620.

The headset interface module (HIM) 625 is the connection between the adapter circuit 600 and the headset 610. The headset interface module 625 typically performs four functions: provide DC bias for an electret microphone, impedance and gain matching for the headset microphone (not shown), impedance and gain matching for the headset receiver (not shown), and (optionally) frequency shaping for the microphone.

A stage 630 represents an audio signal processor (ASP) and a digital microcontroller in the headset adapter circuit 600. Although the ASP and digital microcontroller are shown as a single block in FIG. 11, both components may also be implemented as separate stages or blocks. The control function can also be implemented using analog techniques. The ASP processes the host telephone 615 handset port receive signals, in analog form, from the telephone interface module 605, and produces the analog signals required to operate the headset transducers through the headset interface module 625. The ASP also processes transmit signals from the headset (610) microphone via the HIM (625) and produces the analog signal via the TIM (605) required to drive the telephone line via the telephone host (615). The digital microcontroller is coupled to the user input/output interface 635 and to the ASP, and may be implemented by, for example, a low cost 8-bit microcontroller. Thus, the digital microcontroller transmits control signals between the user input/output interface 535 and the ASP. The user actuates the control elements in the user input/output interface 635 to enable various functions such as coupling the host telephone 615 to the headset 610 or to the handset 620, and the stage 630 and telephone interface module 605 permit the host telephone 615 to be coupled to the headset 610 or handset 620.

Transmit channels "Tx" transmit headset microphone signals to the host telephone 615 via the telephone interface module 605. As also shown in FIG. 11, microphone signals from the telephone handset 620 are also transmitted in a transmit channel Tx to the host telephone 615 via the telephone interface module 605. The dynamic signal processing performed in the transmit channels Tx includes voice expansion on the microphone signal from the headset only. Such voice expansion function reduces ambient noise that is introduced by the user's environment and thus leads to improved telephony sound quality.

Receive channels "Rx" transmit headset earphone signals from the host telephone 615 via the telephone interface module 605. The dynamic signal processing performed in the receive channels Rx include compression, limiting, and expansion. Typically, only signals to or from the telephone interface module 605 are processed for compression and expansion. The compression function provides acoustic limiting at an upper level of loudness limit for the headset user. The expansion function reduces line and background noise by reducing channel gain between words and sentences by the user.

An accessory bus 640 permits control signals to be transmitted to and from an accessory component (not shown). As indicated in FIG. 11, the accessory bus 640 is an optional component in the headset adapter circuit 600.

What is claimed is:

1. An apparatus for coupling a telephone to a headset or handset, the apparatus comprising:
   a deck adapted to support the telephone, the deck comprising a primary fixed deck portion and a movable deck portion coupled to the primary fixed deck portion by an extension slide, the movable deck portion having a top surface which is co-planar to the top surface of the fixed deck portion, and having an adjustable position along the extension slide to vary the width of the deck to accommodate telephones of various widths, such that the telephone contacts both the top surface of the fixed deck portion and the top surface of the movable deck portion; and
   an electronic housing coupled to the deck and including electronic components adapted to couple the telephone to the headset or the handset.

2. An apparatus for permitting a telephone to be coupled to a headset or handset the apparatus comprising:
   an electronic housing including electronic components adapted to couple the telephone to the headset or the handset; and
   a deck coupled to the electronic housing including a top surface adapted to support the telephone, the top surface of the deck defining at least one routing channel for receiving and securely holding a cord coupled to at least one of the electronic components.

3. The apparatus according to claim 1 or 2 wherein the electronic components are coupled to an end of the deck.

4. The apparatus according to claim 1 or 2 wherein the electronic components are disposed within an interior of the deck beneath the top surface.

5. The apparatus according to claim 1 or 2, wherein the telephone provides weight on the deck to stabilize the deck.

6. The apparatus according to claim 2, wherein the deck comprises a primary fixed deck portion and a movable deck portion coupled to the primary fixed deck portion by an extension slide, the movable deck portion having a top surface which is co-planar to the top surface of the fixed deck portion, and having an adjustable position along the extension slide to vary the width of the deck to accommodate telephones of various widths, such that the telephone contacts both the top surface of the fixed deck portion and the top surface of the movable deck portion.

7. The apparatus according to claim 1, wherein the top surface of the deck includes at least one routing channel for receiving and securely holding a cord coupled to the electronic housing.

8. The apparatus according to claim 1 or 2, further comprising a high friction element coupled to a bottom surface of the deck to stabilize the deck.

9. The apparatus according to claim 1 or 2, further comprising a plurality of mounting elements distributed on the deck and adapted to receive and securely hold an accessory component.

10. The apparatus according to claim 9, wherein the mounting elements are distributed along a perimeter of the deck.

11. The apparatus according to claim 9, wherein the mounting elements include plurality of holes.

12. The apparatus according to claim 1 or 2, wherein electronic housing is removably coupled to the deck.

13. The apparatus according to claim 1 or 2 wherein the electronic housing is coupled to an end of the deck.

14. An apparatus for coupling a telephone to a headset or handset, the apparatus comprising:
   means for supporting the telephone, including two portions coupled by a slidable extension means for variably adjusting the width of the support means, the width being adjusted by selectively sliding and positioning one of the portions relative to the other portion of the support means along the slidable extension means to accommodate telephones of various widths; and
   a plurality of electronic components coupled to the supporting means for coupling the telephone to the headset or handset,
   the electronic components including a headset interface module, an audio signal processor coupled to the headset interface module, a controller coupled to the audio signal processor, a user input/output interface coupled to the controller, and a telephone interface module coupled to the audio signal processor.

15. The apparatus according to claim 14, wherein the top surface of the deck includes at least one routing channel for receiving and securely holding a cord coupled to the electronic housing.

* * * * *